United States

Albanese et al.

[11] 4,001,577
[45] Jan. 4, 1977

[54] METHOD AND APPARATUS FOR ACOUSTO-OPTICAL INTERACTIONS

[75] Inventors: Andres Albanese, Matawan, N.J.; Calvin F. Quate, Los Altos Hills, Calif.

[73] Assignee: The Board of Trustees of Leland Stanford Junior University, Stanford, Calif.

[22] Filed: Dec. 5, 1975

[21] Appl. No.: 637,947

[52] U.S. Cl. .................... 250/199; 358/201
[51] Int. Cl.$^2$ ............ G02F 1/33; G02F 2/00; H04B 9/00
[58] Field of Search ............ 178/7.6, 7.1, DIG. 27; 250/199

[56] References Cited

UNITED STATES PATENTS

| | | | |
|---|---|---|---|
| 3,617,931 | 11/1971 | Pinnow | 178/7.6 |
| 3,633,996 | 1/1972 | Lean | 178/7.6 |
| 3,691,387 | 9/1972 | DeLange | 250/199 |
| 3,691,388 | 9/1972 | Patel | 250/199 |
| 3,826,865 | 7/1974 | Quate | 178/7.1 |
| 3,826,866 | 7/1974 | Quate | 178/7.1 |
| 3,827,075 | 7/1974 | Baycura | 178/7.1 |
| 3,836,712 | 9/1974 | Kornreich | 178/7.1 |
| 3,903,364 | 9/1975 | Lean | 178/7.1 |
| 3,944,732 | 3/1976 | Kino | 178/7.1 |

OTHER PUBLICATIONS

Wm. S. C. Chang, "Acousto-optical Deflections in Thin Films," IEEE Journal of Quantum Electronics, Apr. 1971, pp. 167–170.
T. G. Giallorenzi, "Acousto-optical Deflection in Thin Film Waveguides," J. Appl. Phys., vol. 44, No. 1, Jan. 1973, pp. 242–253.
F. R. Gfeller and C. W. Pitt, "Colinear Acousto-Optic Deflection in Thin Films," Electronics Letters, Nov. 2, 1972; vol. 8, No. 22; pp. 549–551.
A. Albanese and C. F. Quate, "Conversion of Guided Light to an Unguided Mode by Acoustic Surface Waves," and "Correction to"; presented at the Topical Meeting on Integrated Optics, Jan. 21–24, 1974, New Orleans, La.

Primary Examiner—Howard W. Britton
Attorney, Agent, or Firm—Flehr, Hohbach, Test Albritton & Herbert

[57] ABSTRACT

Method and apparatus for causing light to interact with surface acoustic waves so that the light is either scattered out of or coupled into an optical wave guide. In the case of scattering when the light is propagating in an optical wave guide and chirped surface acoustic waves interact with the light, the light is scattered out of the optical wave guide into a focused beam. The focused beam of light travels in a path parallel to the surface acoustic waves and at the same velocity as the acoustic waves. The focused beam can scan objects to obtain electrical signals corresponding to the optical image of the objects and also the beam can be focused on a plurality of photodetectors to multiplex the light. In the case of coupling when the light is incident on an optical wave guide and the frequency of the chirped surface acoustic waves is selectively varied, the light is selectively coupled into the optical wave guide in a corresponding manner. The selective coupling of the light permits the frequency spectrum and the angular distribution of the light to be analyzed.

39 Claims, 9 Drawing Figures

METHOD AND APPARATUS FOR ACOUSTO-OPTICAL INTERACTIONS

GOVERNMENT CONTRACT

The invention herein described was made in the course of or under a grant from the Department of the Navy.

BACKGROUND OF THE INVENTION

1. Field of the Invention

This invention generally relates to integrated optical devices and, more particularly, to acousto-optical systems wherein surface acoustic waves interact with light.

2. Description of the Prior Art

In the field of integrated optics, optical systems and devices are constructed on planar surfaces. These systems are designed to have a more compact form and smaller size than comparable bulk optical devices. In addition, integrated optical devices are developed to be compatable with other planar technologies such as integrated electrical circuits and surface acoustic wave propagating media.

In this area of technology it is well known to propagate light through a material near its surface by using an optical wave guide. Such a wave guide is formed by locating a region in the material that has a higher refractive index than the surrounding material. It is also well known in optics that imperfections and perturbations can be used to scatter light out of a wave guide in predominantly one direction.

The concept of colinear acousto-optic interaction was initially proposed by Mr. W. S. C. Chang in an article in the IEEE Journal of Quantum Electronics entitled "Acousto-optical Deflections in Thin Films," April 1971, pages 167–170. Thereafter, this interaction was theoretically described by Mr. T. G. Giallorenzi in an article entitled "Acousto-optical Deflection in Thin-film Waveguides," Journal of Applied Physics, Vol. 44, No. 1, January 1973, pages 242–253. An experimental demonstration of this effect was described by Messers. F. R. Gfeller and C. W. Pitt in an article entitled "Co-linear Acousto-optic Deflection in Thin-films", Electronics Letters, Nov. 2, 1972, Vol. 8, No. 22, pages 549–551.

SUMMARY OF THE INVENTION

The present invention is directed to a method and apparatus for causing light to interact with surface acoustic waves so that the light is either scattered out of or coupled into an optical wave guide. When the light is propagating in an optical wave guide and interacts with chirped surface acoustic waves, the acoustic waves form periodic variations in the index of refraction. These variations in the index of refraction scatter the light out of the wave guide and into a focused beam. The focused beam of light travels in a path parallel to the path of the surface acoustic waves and at the same velocity as the acoustic waves. In the case of coupling when light is incident on an optical wave guide, the light can be selectively coupled into the optical wave guide by varying the frequency of the chirped surface acoustic waves. Under normal circumstances the light is reflected away from the wave guide. However, if the frequency of the acoustic waves is varied until a phase matching condition occurs, the incident light can be coupled into the wave guide and propagated thereby.

In the present invention the focused beam of light obtained by scattering is utilized to scan objects to obtain electrical signals corresponding to their optical images and to scan a plurality of photodetectors and thereby multiplex the light. In addition, in the present invention the frequency of the chirped acoustic waves is selectively varied to achieve the phase matching condition and thereby permitting analysis of the frequency spectrum and/or the angular distribution of the incident light.

It is an object of the present invention to provide a novel method and apparatus that overcomes the limitations and disadvantages of the prior art.

A further object of the present invention is to combine optical wave guide techniques with surface acoutstic wave devices in order to develop optical scanning systems, optical multiplexers, and frequency and angular distribution analyzers.

An additional object of the present invention is to develop an optical scanning apparatus incorporated into a planar surface.

A further object of the present invention is to utilize a chirped surface acoustic wave to selectively couple light into an optical wave guide or to scatter light out of an optical wave guide into a focused beam.

Additional objects and features of the invention will appear from the following description in which the preferred embodiments have been set forth in detail in conjunction with the accompanying drawings.

DESCRIPTION OF THE PREFERRED EMBODIMENTS

Figure 1:
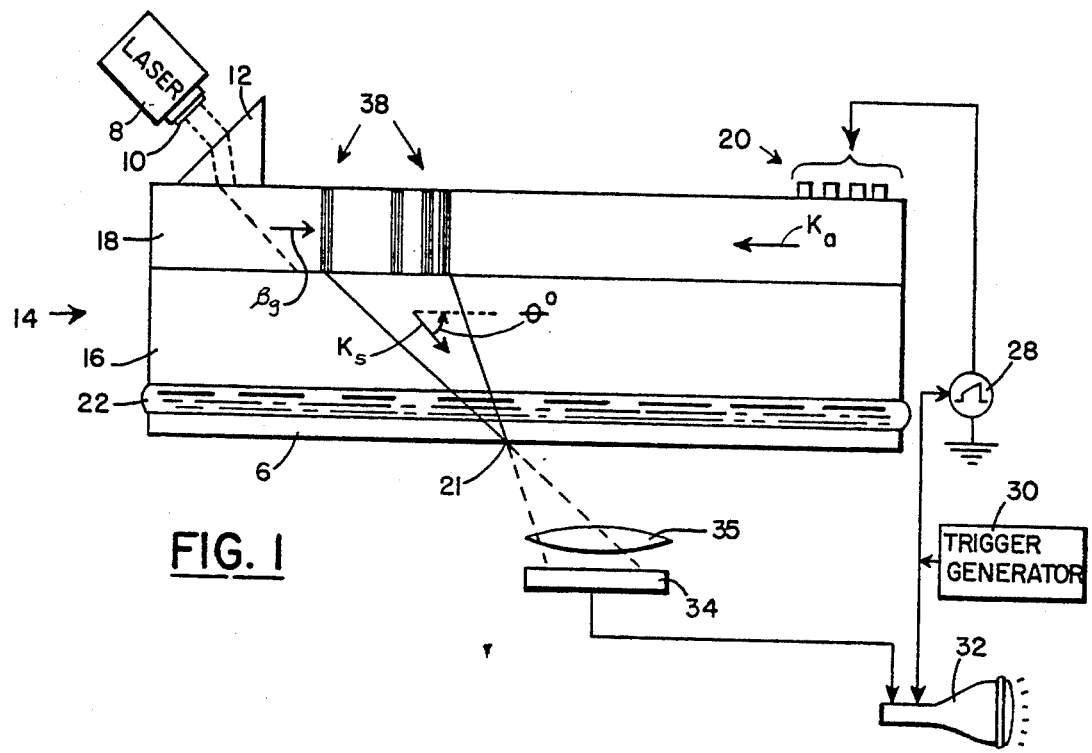
FIG. 1 is a diagrammatic, side elevational view of an apparatus for acousto-optical scanning according to the present invention wherein the light is scattered out of the optical wave guide into a focused beam.

FIG. 1 illustrates an apparatus for causing light to interact with chirped sirface acoustic waves so that the light is scattered out of an optical wave guide and into a focused beam. The focused beam of light scans across an object 6, and the light is modulated by the optical transmittance of the object. A visual image of the object is produced that corresponds to the variations in the optical transmittance of the object.

The acousto-optical scanning system of FIG. 1 includes a conventional laser 8 that generates a collimated beam of light. Located in the output light path of the laser is a polarizing filter 10 which converts the collimated laser light into polarized light. The polarizing filter is orientated so as to polarize the light either into a direction that is both orthogonal to the axis of propagation of the light and in the plane of the figure illustrated in FIG. 1 or into a direction both orthogonal to the axis of propagation and perpendicular to the plane of the figure illustrated in FIG. 1. The polarized light is thereafter directed into a 45° prism 12 that couples the light into an optical wave guide hereinafter described. In the preferred embodiment the 45° prism is fabricated from rutile and refracts the polarized light as illustrated in FIG. 1.

The acousto-optical scanning system of FIG. 1 also includes an acousto-optical assembly generally indicated by reference numeral 14. The acousto-optical assembly includes a substrate 16 and a wave guide 18 fabricated thereon. The substrate is fabricated from lithium niobate (LiNbO$_3$) which is a piezoelectric material and optically transparent to the laser light. The substrate is formed so that the C-axis is either directed laterally or longitudinally to the axis of propagation of the light.

The wave guide 18, FIG. 1, is an optical wave guide that directs the coherent light from the laser 8 down an optical channel. The wave guide consists of a region having a higher refractive index than the surrounding material. In the preferred embodiment the wave guide is formed by diffusing titanium (Ti) into the lithium niobate substrates 16 using conventional techniques. It should be appreciated that although titanium is used in the preferred embodiment the wave guide can also be fabricated from other metals such as copper, vanadium, and nickel.

At the end of the acousto-optical assembly 14, FIG. 1 and remote from the prism 12 is a plurality of interdigital electrodes 20. The interdigital electrodes are found on top of the wave guide 18 by conventional means and are used to generate surface acoustic waves that propagate in the assembly 14 from right to left as illustrated in FIG. 1.

The object 6 being scanned by the system, FIG. 1 is located proximate to the exposed face of the substrate 16 and opposite to the wave guide 18. The object is substantially planar and contains a visual pattern having alternating or differing areas of optical transmittance. Examples of the objects that can be scanned by the present invention include photographic negatives, colored slides and photographic transparencies. The space between the object 6 and the substrate 16 is filled with an impedance matching fluid 22 having a high refractive index. An example of such a fluid is xylene, a commercially available petroleum product. Other liquids of high refractive index can be used. The liquid 22 can also be replaced by a rough surface that scatters the light. The impedence matching fluid is retained between the substrate and the object by surface tension. It should be appreciated that the gap between the substrates and the object illustrated in FIG. 1 has been exaggerated and, in actual fact, the two surfaces are almost in direct physical contact.

In the embodiment of FIG. 1 the object 6 is held stationary and is scanned by a beam of light focused on a point indicated by reference numeral 21. The point 21 represents a focal line extending perpendicular to the plane of the figure and having a length roughly equal to the width or diameter of the collimated light beam obtained from the laser 8. As hereinafter described, the focal line 21 propagates in a path parallel to the surface acoustic waves, from right to left as illustrated in FIG. 1 and at the same velocity of propagation as the acoustic waves.

The acoutso-optical scanning system, FIG. 1, also includes an electrical sub-assembly that generates acoustic surface waves and processes the optical output. This sub-assembly includes a chirp generator 28 that is connected to the interdigital electrodes 20. The chirp generator provides an R.F. output signal that varies in frequency at a rate measured with repect to time. The R.F. output signal causes the interdigital electrodes to induce a chirped acoustic wave that propagates along the surface of the acousto-optical assembly 14. In the preferred embodiment the chirp generator 28 operates in a frequency range of between 100 to 200 MHz and provides chirped R.F. output signals that increase at a rate of 10 MHz per microsecond. It should be appreciated, however, that depending upon the fabrication and construction of the interdigital electrodes 20 the present invention is capable of operating in a frequency range of between 100 MHz and 2 GHz.

The chirp generator 28 is started by a trigger generator 30. The trigger generator is a conventional pulse generator that also starts the horizontal sweep of a standard, commercially avaliable oscilloscope 32. The horizontal sweep of the oscilloscope is set to correspond to the length of time required for a surface acoustic wave to propagate from one end of the acousto-optical assembly 14 to the other end. The vertical input to the oscilloscope is provided by a photodetector 34. The photodetector receives the light modulated by the object 6 and gathered by the simple convex lens 35. The photodetector converts the varying intensity of the light into corresponding electrical signals which are passed to the oscilloscope.

In one embodiment of the present invention actually constructed the laser 8 was a helium-neon laser having an output of one milliwatt and a wavelength of 6238 angstroms. The lithium niobate substrate 16 was 5 mm thick and the gap between the substrate and object 6 was 5 mm thick and the gap between the substrate and object 6 was approximately one-half to 2 mls. The distance between the prism 12 and the interdigital electrodes 20 was approximately two inches and the length of time required for surface acoustic wave to propagate from one end of the assembly to the other was approximately 16 microseconds. The wave guide 18 was approximately one to 3 microns thick. The interdigital electrodes 20 had an interdigital spacing of approximately four microns. These electrodes were fabricated by first dipositing a layer of chrome approximately 50 angstroms thick on the titanium wave guide 18 and then depositing a layer of gold on top of the chrome approximately 1,000 angstroms thick. The focal line 21 moved from right to left at a velocity of 3.2 cm per microseconds — the same velocity as the surface acoustic waves. The oscilloscope 32 was synchronized so that one horizontal sweep of the scan raster compared with one scan of the focal line from one end of the assembly 16 to the other. Accordingly, the duration of the horizontal sweep of the oscilloscope was approximately 3 microseconds.

It should be appreciated that although rutile prisms 12 are shown and descirbed in the preferred embodiments, other optical couplers can be used to get the coherent light into and out of the waveguide. Such couplers include a grading coupler having a plurality of perturbations located along one surface so that light incident thereon is scattered into the waveguide. Such a coupler can be located along the top edge of the waveguide 18, FIG. 1. A second such optical coupler cna be fabricated by tapering the end of the waveguide 18 in order to form a refracting surface. By properly locating the angle of incidence of the coherent light, the light can be refracted into the waveguide. Thus, the prism 12, FIG. 1 is not specifically required nor is its placement critical to the present invention.

In operation, the acousto-optical scanning system 14, FIG. 1, simultaneously counter propagates a beam of light and a surface acoustic wave so that the light interacts with the acoustic wave. The light is generated by the laser 8, refracted by the prism 12 and coupled thereby into the optical waveguide 18. The coherent light propagates in the optical waveguide from left to right as illustrated in FIG. 1. The vector $\beta g$ indicates the direction of propagation.

The surface acoustic wave is generated by the interdigital electrodes 20 which are connected to he chirp generator 28 and the trigger generator 30. The vector $k_a$ indicates the direction of propagation.

When two sets of waves interact and the phase matching condition, hereinafter described, is achieved, the surface acoustic waves cause periodic variations in the index of refraction of the wave guide. These periodic variations scatter the light out of the wave guide. In effect, the surface acoustic waves form an acoustic grating 38. The light thereafter passes through the transparent substrate 16 and comes to a focus at the focal line 21. The light is brought to a focus because the acoustic waves are chirped. The focal line travels from right to left in FIG. 1 at the same velocity as the surface acoustic waves propagates. In other words, the chirp pulse generates an acoustic grating that propagates from right to left when the phase matching condition, hereinafter described, is achieved.

Since the object 6, FIG. 1 contains areas of varying optical transmittance, the light incident on the object is accordingly modulated. The object is positioned so that the focal line 21 is proximately coincident and sweeps across its surface. After being transmitted through the object, the modulated light is gathered by the lengs 35 and received by the photodetector 34. The photodetector continuously receives the modulated light as the focal line scans across the object. The photodetector converts the modulated light into corresponding electrical signals that provide the vertical input to the oscilloscope 32. The oscilloscope is synchronized with the scanning assembly so that one horizontal sweep of the oscilloscope is equivalent to one scan of the focal line 21 across the object. The variations in optical transmittance of the object appear on the oscilloscope as vertical deflections of the trace.

Figure 8:
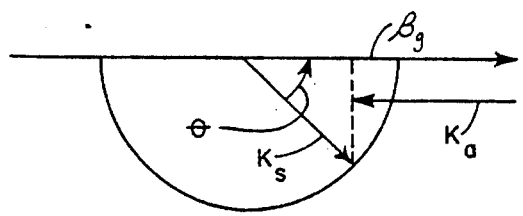
FIGS. 8 and 9 are vector diagrams illustrating the phase matching condition required for coupling acoustic waves with light waves.

The phase matching condition required for scattering the light propagating in the waveguide 18, FIG. 1, is illustrated in the vector diagram, FIG. 8. For both the acoustic waves and the light waves described herein the amplitude of each wave is given by the following equation:

$$A = A_0 \cos(wt - \vec{k} \cdot \vec{r}) \tag{1}$$

where $A$ = the amplitude of the wave
$w$ = the frequency of the wave
$t$ = the time variable
$\vec{k}$ = the propagation vector
$\vec{r}$ = the position vector or space variable The propagation vector $\vec{k}$ has a direction parallel to the axis or propagation of the wave and a magnitude equal to the quotient of the frequency of the wave ($w$) and the velocity of propagation of the wave. In FIG. 8 $\vec{k}_s$ is the propagation vector of the light in the substrate 16, FIG. 1; $\vec{k}_a$ is the propagation vector of the surface acoustic waves along the surface of the lithium niobate; and $\beta_g$ is the propagation vector of the light in the wave guide 18, FIG. 1.

In the vector diagram of FIG. 8 the coupling condition occurs when:

$$\beta_g = k_s \cos\theta - k_a \tag{2}$$

In other words, when equation 12 is satisfied, the light propagating in the wave guide 18, FIG. 1 is scattered out by the chirped acoustic wave.

Figure 3:
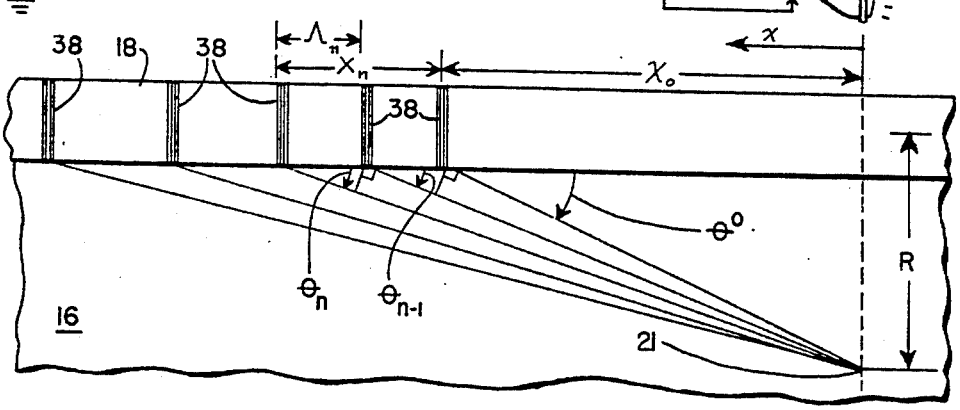
FIG. 3 is a diagram illustrating the geometry and mathematics describing how light is scattered out of the optical wave guide of FIG. 1.

As hereinbefore described, the light propagating in the wave guide 18, FIG. 1 is scattered out of the wave guide when equation 2 is satisfied and is brought to a focus along line 21. The focusing of the scattered light can be explained by assuming that the wave guide contains a plurality of perturbation elements. Referring to FIG. 3 these perturbation elements are identified by reference numeral 38.

It is well known that for the scattered light from any two perturbation elements to add constructively at a point, the phase difference between the two beams of light at that point from the elements must be an integral multiple of 2.

In FIG. 3 the phase from point 39 to point 40 plus the phase from point 40 to point 21 is given by the following equations:

$$\beta_g \Lambda_n + k_s \frac{R}{\sin\theta_{n-1}} = \phi_1 \tag{3}$$

where
$\beta_g$ = the propagation vector of the light in the wave guide
$k_s$ = the propagation vector of the light in the substrate
$\Lambda_n$ = the wavelength of the surface acoustic wave The phase from point 39 to point 21 is given by:

$$k_s \Lambda_n \cos\theta_n + k_s \frac{R}{\sin\theta_{n-1}} = \phi_2 \tag{4}$$

whenever $x_0 >> \Lambda_n$

For constructive interference $\phi_1 - \phi_2 = 2\pi$. Thus, the condition for such constructive interference is given by:

$$\beta_g - k_s \cos\theta_n = \frac{2\pi}{\Lambda_n} \tag{5}$$

From FIG. 3 it can be seen that $$\cos\theta_n = \frac{1}{\sqrt{1+\tan^2\theta_n}} \approx 1 - \frac{1}{2}\tan^2\theta_n = \tag{6}$$

-continued $$1 - \frac{1}{2}\left(\frac{R}{x_o + x}\right)^2$$

$$\cos \theta_o \approx 1 - \frac{1}{2}\left(\frac{R}{x_o}\right)^2 \text{ for } R \ll x_o \qquad (7)$$

At the point 41, FIG. 3:

$$\beta_s - k_s \cos \theta_o = \frac{2\pi}{C_a} f_o \qquad (8)$$

where $C_a$ = the velocity of the surface acoustic wave
$f_0$ = the frequency of light that scatters light at an angle of $\theta_0$.

The frequency of the perturbation elements 38 for constructive interference is given by:

$$\frac{2\pi}{C_a}(f_o - f_n) = k_s (\cos \theta_n - \cos \theta_o) \qquad (9)$$

$$\frac{2\pi}{C_a}(f_o - f_n) = \frac{k_s}{2} R^2 \left[ \frac{1}{x_o^2} - \frac{1}{(x_o + x)^2} \right] \qquad (10)$$

For small angles of $\theta$ $$f_n = f_o - \frac{C_a}{\lambda_o} n_s \frac{R^2}{x_o^2} \cdot \frac{x}{x_o} \qquad (11)$$

where $\lambda_0$ = the wavelength of the light
$n_s$ = the index of refraction of the substrate Equation 9 describes the array of perturbation elements that can scatter light into a focal point by constructive interference. This equation also expresses the frequency of the chirped acoustic waves propagated along the wave guide 18 according to the present invention. The chirp rate or the increase in frequency per unit of time of the surface acoustic waves is given by:

$$\Delta f_n = \frac{C_a n_s}{\lambda_o} \cdot \frac{R^2}{X_o^2} \cdot \frac{X}{X_o} \qquad (12)$$

Figure 2:
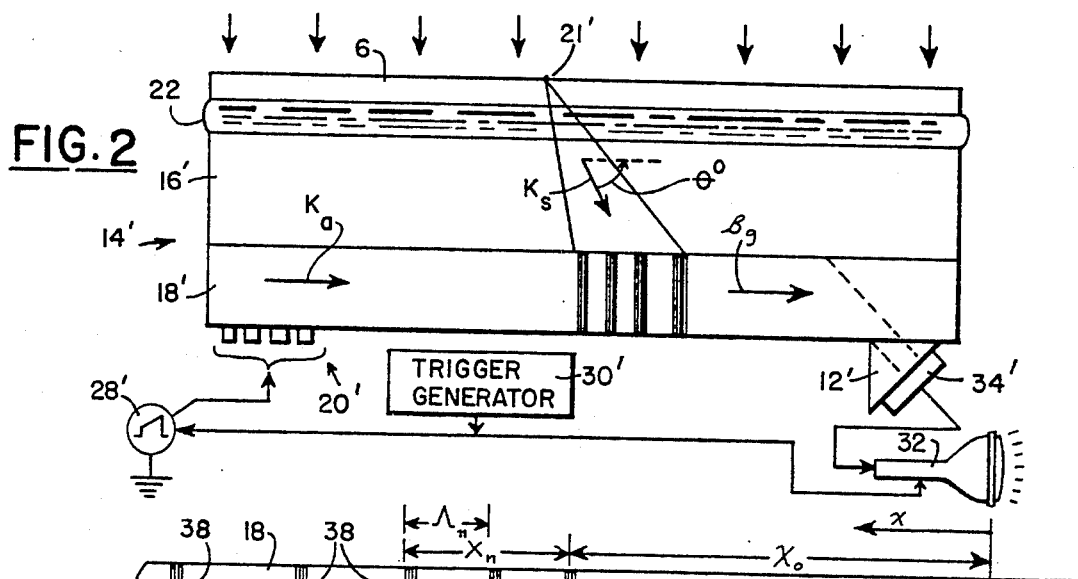
FIG. 2 is a diagrammatic, side elevational view of an apparatus for acousto-optical scanning according to the present invention wherein the light is selectively coupled into the optical wave guide.

Referring to FIG. 2, reference numeral 14' generally indicates an apparatus for acousto-optical scanning wherein the light is selectively coupled into an optical wave guide. The apparatus in FIG. 2 is a complementary assembly to the apparatus illustrated in FIG. 1. As in all figures, like reference numbers indicate like parts, and the prime numbers merely differentiate the location of the identified parts.

The acousto-optical assembly 14', FIG. 2 includes a substrate 16' and a wave guide 18' fabricated thereon. In the preferred embodiment the substrate is fabricated from lithium niobate and the wave guide is focused by diffusing titanium into the lithium niobate substrate. The light in the wave guide is coupled out of the wave guide, as hereinafter described, into the rutile prism 12' and the photodetector 34. The photodetector converts the modulated light incident thereon into corresponding electrical signals.

At the end of the acousto-optical assembly 14; FIG. 2 and remote from the prism 12' is a plurality of interdigital electrodes 20'. The interdigital electrodes are used to generate surface acoustic waves that propagate in the assembly 14' from left to right as illustrated in FIG. 2. The interdigital electrodes are driven by a chirp generator 28' that provides s chirped R.F. output signal. The chirp generator is started by a trigger generator 30'. Both the trigger generator and the photodetector 34' are connected to the oscilloscope 32 in the same manner as hereinbefore described in connection with FIG. 1.

The object 6 being scanned by the system, FIG. 2 is located proximate to the exposed face of the substrate 16 and opposite to the wave guide 18'. As in FIG. 1 the object is substantially planar and contains a visual pattern having alternating or differing areas of optical transmittance. The space between the object 6 and the substrate is filled with an impedance matching fluid 22 having a high refractive index such as xylene. Other liquids of high refractive index can also be used. A rough surface that scatters the light may replace the liquid. The impedance matching fluid is retained between the substrate and the object by surface tension.

In the embodiment of FIG. 2 the object 6 is held stationary and is subjected to incident monochromatic light from a source (not shown). The light passes through the object, is modulated by the differeing areas of optical transmittance, and thereafter passes through the fluid 22 and the substrate 16'. If the phase matching condition, hereinafter described, is achieved, the light is coupled into the wave guide 18'. If the phase matching condition is not achieved, the light is not coupled into the wave guide and passes out of the assembly 14' either through refraction or reflection.

The phase matching condition is created by the interaction of the light in the substrate 16', FIG. 2 and the surface acoustic waves propagating along the wave guide 18'. The coupling condition is such that only the light passing through point 21' is phase matched into the wave guide. Poing 21' in FIG. 2 is analogous to the line focus 21 in FIG. 1. In effect point 21' sweeps across the object 6 at the same velocity as the acoustic waves and only the monchromatic light passing through point 21', as it moves, is coupled into the wave guide.

Figure 9:
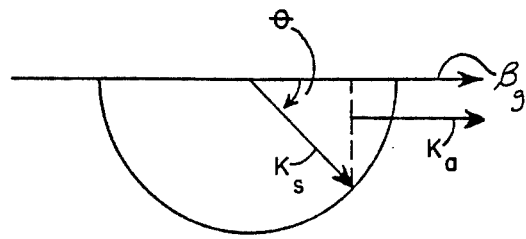

The phase matching condition required for coupling the light incident on the wave guide 18', FIG. 2 into the wave guide is illustrated in FIG. 9. As described hereinbefore, the propagation vectors $\beta g$, $k_a$, and $k_s$ represent respectively, the light in the wave guide 18'; the surface acoustic waves; and the light in the substrate 16'. The phase matching condition occurs in the apparatus of FIG. 2 when:

$$\beta g = k_s \cos \theta + k_a \qquad (13)$$

After the light is coupled into the wave guide 18', FIG. 2, the light propagates from left to right as illustrated in FIG. 2. The light next is refracted out of the wave guide and into the prism 12' and photodetector 34'. The photodetector continuously receives the modulated light and converts the light into corresponding electrical signals that provide the vertical input to the oscilloscope 32. The oscilloscope is synchronized by the trigger generator 30' so that one horizontal sweep of the oscilloscope is equivalent to one scan of the line 21' across the object. The variations in optical transmittance of the object appear on the oscilloscope as vertical deflections of the trace.

Figure 4:
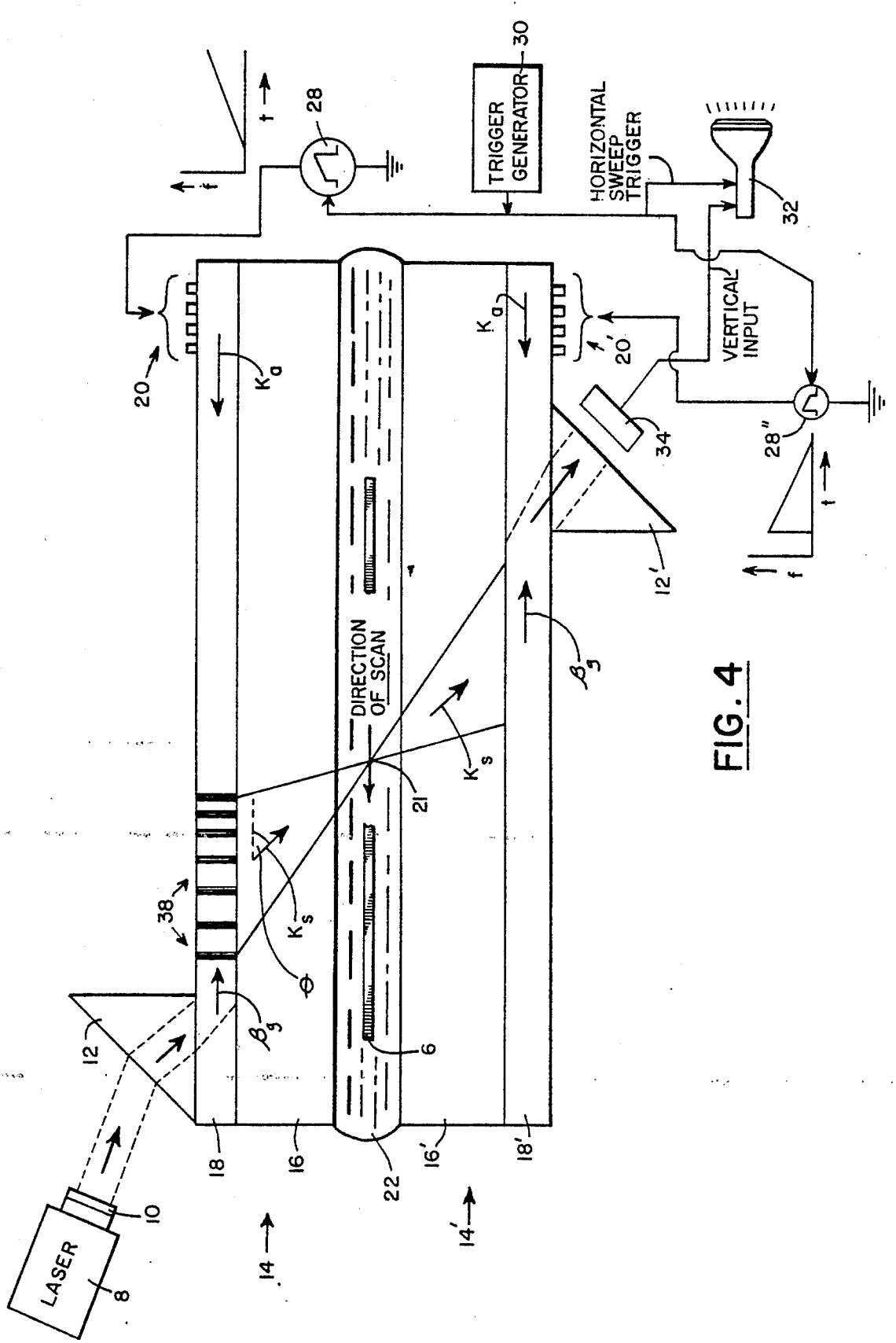
FIG. 4 is a diagrammatic, side elevational view of an apparatus for acousto-optical scanning wherein the scanning light is both scattered out of and coupled into optical wave guides.

FIG. 4 illustrates the combination of the acousto-optical scanning assemblies 14, 14' hereinbefore described and illustrated in FIGS. 1 and 2. The convex lens 35, FIG. 1 and the photodetector 34 are replaced by the entire scanning assembly 14'. This scanning assembly 14' is illustrated by light from the assembly 14 passing through the focus 21.

It should be noted that there are two sets of interdigital electrodes 20–20', FIG. 4 and that they are located at the same end of the appratus. The electrodes 20 are activated by a chirp generator 28 that produces an output chirp signal that increases in frequency with respect to time. The graph in FIG. 4 located nearby chirp generator 28 illustrates this time ($t$) — frequency ($f$) variation. The electrodes 20' are activated by a chirp generator 28'' that produces an output chirp signal that decreases in frequency with respect to time. The other graph in FIG. 4 nearby chirp signal generator 28' illustrates this second time - frequency variation. The chirp generators 28, 28'' are simultaneously started by a conventional trigger generator 30. This simultaneous activation causes the chirped acoustic waves generated by the electrodes to propagate in step through the wave guides 18, 18' with the same speed and phase. Accordingly, the two acoustic propagation vectors $k_a$ have the same direction.

The operation of the combined system, FIG. 4, is substantially the same as the operation of the individual systems 14, 14' hereinbefore described. The light propagating in the wave guide 18 is scattered out by the chirped acoustic waves because equation 2 is satisfied. The scattered light is thereafter formed on the line 21 which scans across the object 6. Since the object has areas of differing optical transmittance, the light is modulated accordingly. The light thereafter passes through the substrate 16' and is incident on the wave guide 18'. Since the phase matching condition (equation 2) is also satisfied for the modulated light, this light is coupled into the wave guide 18'. Next the light is diffracted into the prism 12' and converted into an electrical signal by the photodetector 34. The electrical signal from the photodetector provides the vertical input to the oscilloscope 32. The horizontal sweep of the oscilloscope is triggered by trigger generator 30 and is timed to correspond to the duration of the sweep of the focal line 21 across the object 6. The variations in optical transmittance of the object appear on the oscilloscope or vertical deflections of the trace.

Figure 5:
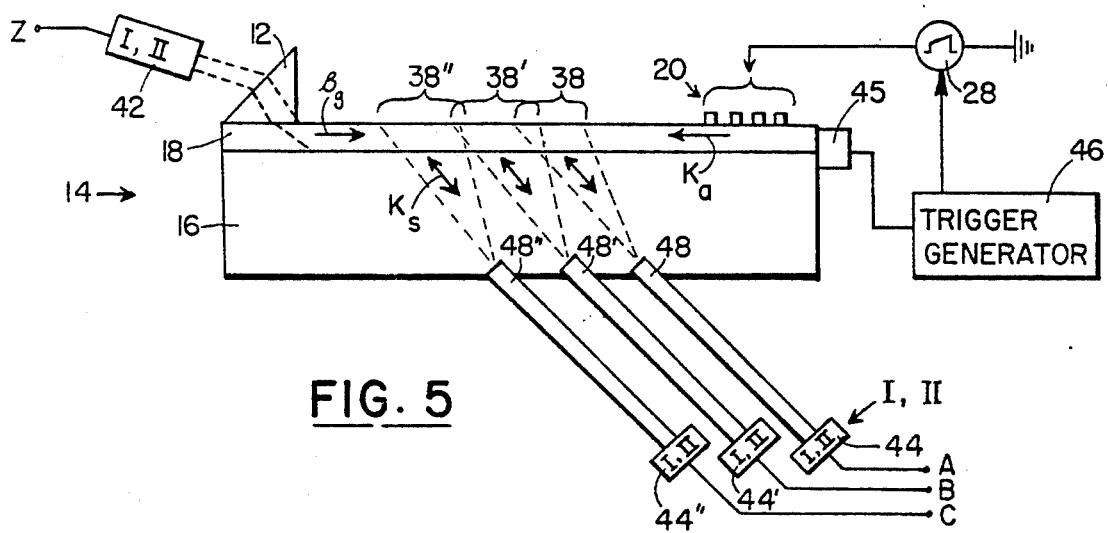
FIG. 5 is a diagrammatic, side elevational view of the apparatus of FIG. 1 wherein the light is optically multiplexed.
Figure 6:
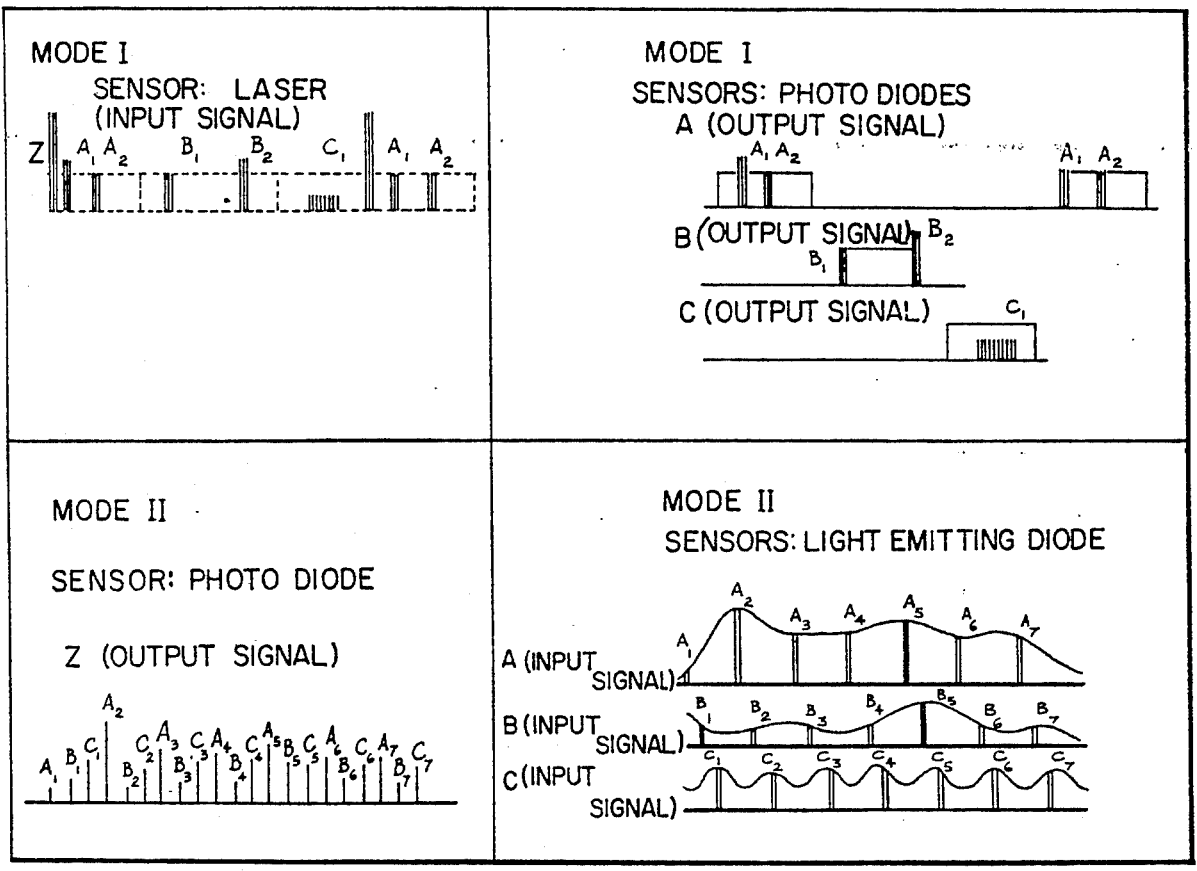
FIG. 6 is a table illustrating two modes of optical multiplexing utilized by the apparatus of FIG. 5.

In FIGS. 5 and 6 a system for optically multiplexing an electrical signal using acousto-optical interaction is illustrated. The system transmits light in two directions and operates in two modes. In FIG. 5 reference numerals 42, 44 each indicate an electro-optical converter. Depending upon the operating mode, these converters either change the optical inputs into corresponding electrical outputs or electrical inputs into corresponding optical outputs.

In mode 1 the electro-optical converter 42 includes a laser and a conventional electro-optical modulator. The laser generates a continuous beam of collimated light that is modulated on and off by the electro-optical modulator. THe modulator operates in response to the electrical input signals on line Z. Accordingly, the collimated light incident on the prism 12 can be both pulse code modulated and have a varying pulse repetition rate as illustrated in FIG. 6.

The modulated light from the laser is refracted by the prism 12, FIG. 5 and coupled into the optical wave guide 18 in the manner hereinbefore described. The acousto-optical assembly 14, FIG. 5 is constructed and operates in the same manner as the assembly illustrated and described in connection with FIG. 1. It should be noted, however, that the chirp generator 28 is started by a trigger generator 46 that is activated by a photodetector 45. The electro-optical modulator and the laser 42 generate a laser output trigger pulse that signals the beginning of each sampling interval. The laser trigger pulse is illustrated in FIG. 6, Mode I, Sensor:Laser. This trigger pulse is detected by the photodetector 45 which through the trigger generator starts the chirp generator 28. The trigger generator synchronized the chirp generator with the laser modulator so that the phase matching condition (equation 2) is achieved.

In addition, there is located in the substrate 16, FIG. 5 of the acousto-optical assembly 14, a plurality of fiber optics 48. The fiber optics are located in the exposed planar surface of the substrate opposite to the wave guide 18 and are inclined at an angle $\theta$ which corresponds to the angle 0 in equation 2. The fiber optics are located to receive the focused light coupled out of the wave guide 18 by the surface acoustic wave. The light is converged to a focal line in the same way as the focal line 21, FIG. 1 is formed. This focal line scans across the ends of the fiber optics in the same manner as the object 6 is scanned in FIG. 1. Further, there is mounted on the end of each fiber optic 48 an electro-optical converter 44. In Mode I the electro-optical converters are photodiodes which convert the light incident on the fiber optics into electrical signals that appear on lines A, B, and C.

It should be appreciated that the fiber optics 48 can be located anywhere along the substrate 16 as long as they are scanned by the focal line of light. In the preferred embodiment the fiber optics are parallel and equidistant; however, this spacing and alignment is not mandatory.

In operation in Mode I, the optical multiplexor illustrated in FIG. 5 separates the electrical input signals appearing on line z with respect to time and the resulting output on lines A, B and C. In particular, the electrical input signals on line z are utilized to modulate the light from the light from the laser as hereinbefore described, and the modulated light is thereafter coupled into and propagated in the wave guide 18. It should be appreciated that when compared with the speed of the acoustic waves, the modulated light propagating in the wave guide travels at infinite velocity. Accordingly, any modulation of the light appears instantly throughout the system.

As hereinbefore described, the interdigital electrodes 20 FIG. 5 generate a chirped surface acoustic wave that interacts with the modulated light in the wave guide 18. The chirped acoustic wave couples the modulated light out of the wave guide 18 and into the fiber optics 48.

When the chirped acoustic wave or pulse is in the region indicated by reference numeral 38, any modulation of the light occurring during that time is received by the fiber optic 48 and appears on the output line A. It should be appreciated that the acoustic waves travel at the comparably slow speed of 3,770 m/sec in lithium niobate and are propagated in this embodiment as a series of pulses each having a linearly increasing frequency measured with respect to time. When the chirped acoustic wave travels to the region indicated by reference numeral 38', any modulation of the light occurring during that time period is transmitted to the second fiber optic 48' and appears on output line B. In like manner, when the surface acoustic wave has traveled to the region indicated by reference numeral 38" any modulation of the light is received by the fiber optic 48" and appears on line C. The output signals appear on the lines A, B and C because the focal line sequentially scans across each fiber optic and any modulation of light occurring during that period when the focal line is directed on a particular fiber optic appears on the associated output line.

Referring to FIG. 6, mode I the input signals appearing on line z over a period of time are illustrated. This time period, as illustrated, is divided into four intervals that correspond to the time required for a chirp pulse to pass through one of the regions 38, FIG. 5. The input signals $A_1$, $A_2$ occurring in the first time interval are multiplexed and appear on the output line A because the acoustic chirp pulse propagating at the time was in region 38. It should be understood that any input signal occurring within the first time interval would appear as an output signal on line A. The input signals $B_1$, $B_2$ occurring in the second time interval are likewise multiplexed and appear on output line B because in the second time interval the acoustic chirp pulse was propagating in region 38'. In like manner the input signal $C_1$ is multiplexed and appears on line C. The fourth time interval, during which signals $A_1$ and $A_2$ appear, occurs as a second, succeeding acoustic chirp pulse is propagated in the system and passes through region 38. In this manner all of the input signals appearing on line z are separated and appear on output lines A, B, C during sequential time intervals.

When the optical multiplexer illustrated in FIG. 5 is operated in mode II, the system sequentially samples three electrical input signals and provides one multiplexed output signal. The multiplexer operates in a manner analogous to the system illustrated in FIG. 2 in that light is propagated in the substrate 16 and is selectively coupled into the wave guide 18. In mode II the electro-optical converters 44 receive electrical input signals on lines A, B and C and convert these inputs into modulated light. In the preferred embodiment the converters are either light-emitting diodes or laser diodes. Further, in mode II the electro-optical converter 42 converts the modulated light from the prism 12 into an electrical output signal on line z. In the preferred embodiment this converter is a photodiode. It should be noted that the trigger generator 46 is not required in mode II.

In operation in mode II, the optical multiplexer, FIG. 5, receives three simultaneous electrical input signals on lines A, B and C. These input signals are individually converted into three beams of light by the light-emitting diodes 44, 44' and 44". The three beams of light vary in intensity in a manner corresponding to the input signals that drive the diodes. The three modulated light beams from the diodes are directed into the substrate 16 and toward the optical wave guide 18. When the interdigital transducer 20 generates an acoustic chirp pulse that propagates along the surface of the wave guide, the phase matching condition occurs in turn for each one of these separate beams of light. The acoustic chirp pulse sequentially samples each light beam by coupling into the wave guide the light present in each beam at the time the acoustic pulse crosses the beam. The output from a fiber optic is not coupled into the wave guide 18 unless an acoustic chirp pulse is present in the associated region indicated by reference numeral 38. The sampled light in the wave guide is thereafter refracted by the prism 12 into the photodiode 42 and a corresponding electrical output is generated.

In FIG. 6, mode II the three continuous, variable inputs on lines A, B, and C are illustrated with respect to time. A single acoustic chirp pulse propagating through the multiplexer from right to left samples the three input signals at the points A1, B1 and C1. The output on line z appears as three corresponding pulses A1, B1 and C1. The next surface acoustic wave propagated through the multiplexer samples the three input signals at the points A2, B2 and C2. The output on line z appears as the corresponding pulses A2, B2 and C2. Accordingly, it can be seen that each acoustic chirp pulse propagated through the multiplexer samples in sequence each of the modulated light beams originating from the fiber optics. In the preferred embodiment acoustic chirp pulses are propagated in a regularly recurring cycle so that the three inputs are continuously sampled.

Figure 7:
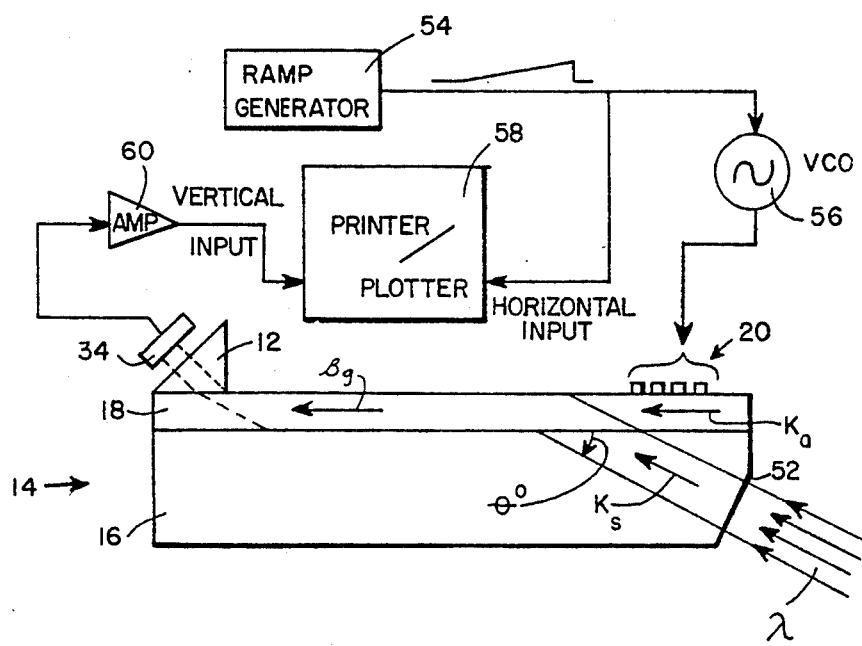
FIG. 7 is a diagrammatic, side elevational view of an apparatus for analyzing both the frequency spectrum and the angular distribution of incident light.

FIG. 7 illustrates an apparatus for determining both the wavelength and the angular distribution of incident light. The apparatus includes an acousto-optical assembly 14 comprising a substrate 16, a wave guide 18, a prism 12 and a set of interdigital electrodes 20. The assembly 14 is constructed in the same manner as the assembly illustrated in FIG. 1 and described hereinbefore. In addition, the substrate 16 further includes an optical input surface 52 formed in the lower edge of the substrate. To minimize refraction, the input surface is polished and positioned so as to be orthogonal to the axis of propagation of the incident light indicated by the Greek letter $\lambda$. The light incident on the input surface passes through the substrate 16 and is incident on the wave guide 18.

The apparatus illustrated in FIG. 7 also includes an electronic circuit for processing the output signals from the acousto-optical assembly 14 and for generating surface acoustic waves therein. This electronic circuit includes a conventional ramp signal generator 54 the output of which is a linearly increasing voltage. In the preferred embodiment the output signal from the ramp generator is a linearly increasing signal that varies from zero to one volt in approximately one minute. The output of the ramp generator is connected to a conventional printer/plotter 58 and is the horizontal input to the display. The output of the ramp generator is also connected to a conventional voltage controlled oscillator 56. The output of the voltage controlled oscillator is a variable frequency signal that changes in proportion to the input voltage to the oscillator. Accordingly, the output of the voltage controlled oscillator 56 is a continuous, slowly increasing frequency signal that in one minute scans the operating frequency spectrum of the system. The output of the voltage controlled oscillator 56 is connected to a plurality of interdigital electrodes 20 located on the acousto-optical assembly. The voltage controlled oscillator thereby generates surface acoustic waves that linearly increase in frequency.

The apparatus illustrated in FIG. 7 also includes a photodetector 34 that converts the light refracted out of wave guide 18 into an electrical signal that is passed to an amplifier 60. The output of the amplifier 60 provides the vertical input to the printer/plotter 58 hereinbefore described.

In operation, the apparatus of FIG. 7 determines the frequency or frequencies of the light incident on the input surface 52 by utilizing the acousto-optical interaction hereinbefore described. The light incident on the apparatus can be coupled into the wave guide 18 only when the phase matching condition is satisfied. This phase matching condition occurs when:

$$\beta g = k_s \cos \theta + k_a \qquad (13)$$

Equation 13 is solved to provide a value for $k_s$ which in turn gives $f = k_s v_s$
where
$f$ = the frequency of incident light
$k_s$ = propagation vector light in the substrate
$v_s$ = velocity of light in the substrate The propagation vector $k_a$ of the acoustic waves can be determined for equation 13 from the display of printer/plotter 58. In the system the interdigital electrodes 20, FIG. 7, generate surface acoustic waves that slowly increase in frequency. When the precise, frequency matching, surface acoustic wave is generated, the incident light is coupled into the wave guide 18. At all other times, the light is not coupled and is reflected by the wave guide back into the substrate and out of the assembly. After the light is coupled into the wave guide, it passes through the prism 12 and is incident on the photodetector 34. The photodetector converts the light into an electrical input to the amplifier 60 and generates a vertical pulse on the display of printer/plotter 58. The display generated on the printer/plotter is a plot of the photodetector output versus the changing frequency of the surface acoustic waves. Thus, when the light is coupled into the wave guide 18 and a vertical pulse is generated on the printer/plotter display, the frequency of the surface acoustic wave at coupling can be determined. Knowing the frequency of the surface acoustic wave at coupling, the propagation vector $k_a$ can be determined from the following equation:

$$k_a = \frac{f_a}{V_a} \qquad (14)$$

where
$f_a$ = the frequency of the acoustic wave at coupling (14)
$v_a$ = the velocity of the acoustic wave in the lithium niobate The angle of incidence $\theta$ can be measured by conventional means.

The propagation constant $\beta g$ of the light in the wave guide is related to the wavelength $\lambda$ of the incident light by the following equation:

$$\arctan\left\{\left(\frac{\beta_o^2 - n_3^2 K^2}{n_1^2 K^2 - \beta_o^2}\right)^{1/2}\right\} + \arctan\left\{\left(\frac{\beta_o^2 - n_2^2 K^2}{n_1^2 K^2 - \beta_o^2}\right)^{1/2}\right\} + N\pi = (n_1^2 K^2 - \beta_o^2)^{1/2} t \qquad (15)$$

where:
$n_1$ = the index of refraction of wave guide
$n_2$ = the index of refraction of the substrate
$n_3$ = the index of refraction of air $$k = \frac{2\pi}{\lambda}$$

$t$ = the thickness of the wave guide
$N$ = an integral number corresponding to the possible guide modes that can propagate in the wave guide.

Equation 15 has a plurality of solutions corresponding to the possible guide modes available. A unique, single valued relation between the propagation constant $\beta g$ and the incident wavelength $\lambda$ can be obtained by limiting the operating frequency range of the system.

For the single guide mode region where $N = 1$, the operating range of the apparatus should be limited to:

$$\lambda_{max} = \frac{2\pi t(n_1^2 - n_2^2)^{1/2}}{ATN\left(\left(\frac{n_2^2 - n_3^2}{n_1^2 - n_2^2}\right)^{1/2}\right)}$$

and $$\lambda_{min} = \frac{2\pi t(n_1^2 - n_2^2)^{1/2}}{ATN\left(\left(\frac{n_2^2 - n_3^2}{n_1^2 - n_2^2}\right)^{1/2}\right) + \pi}$$

Equation 15 can thus be solved for $\beta g$ as a function of $\lambda$ and substituted into equation 13. $K_s$ and the frequency $f$ of incident light are thereby obtained.

It should be appreciated that the apparatus illustrated in FIG. 7 can also analyze incident light having multiple frequencies. The construction and operation of the apparatus is the same. For each frequency present in the incident light, a separate, vertical pulse is recorded on the printer/plotter 58. From the position of each one of these pulses, the frequency of the corresponding surface acoustic wave at coupling can be determined. With these frequencies, the wavelengths of the incident light can be determined from equations 13, 14 and 15.

If the frequency $f$ of the incident light is known, the apparatus of FIG. 7 can also determine the angular distribution of incident light. The apparatus operates in the same manner as hereinbefore described.

The frequency of the surface acoustic waves propagating in the assembly 14 is slowly increased until the incident light is coupled in the wave guide 18. The incident light is only coupled when the phase matching condition (Eqn. 13) is achieved. From the plot of the printer/plotter 58, the frequency $f_a$ at coupling of the surface acoustic wave is determined and equation 14 can be solved. Since the frequency of the incident light is known, $k_s$ can be determined and $\beta g$ from equation 15 calculated. Having these quantities, angle $\theta$ can be obtained from equation 13.

Although the best modes contemplated for carrying out the present invention have been herein shown and described, it will be apparent that modification and variation may be made without departing from what is regarded to be the subject matter of the invention.

What is claimed is:

1. Apparatus for interacting substantially coherent, monochromatic light with surface acoustic waves, comprising:
   a. optical wave guide means for propagating light therein;

b. an acoustic surface wave propagating medium positioned such that surface acoustic waves propagated therein interact with the light in the optical wave guide means; and c. chirp generator means connected to the acoustic surface wave propagating means for generating and propagating chirped surface acoustic waves in the acoustic surface wave propagating medium, said surface acoustic waves form periodic variations in the index of refraction of the optical wave guide means and thereby interact with said light.

2. The apparatus of claim 1 further including:

a. means for coupling substantially coherent monochromatic light incident on the apparatus into the wave guide means so that said light propagation therein; and b. wherein the chirp generator means propagates surface acoustic waves having a frequency variation that couples the light propagating in the wave guide means out of the wave guide and into a focused beam.

3. The apparatus of claim 1 further including:

a. means for directing substantially coherent monochromatic light onto the optical wave guide means; and b. wherein the chirp generator means propagates surface acoustic waves having a frequency variation that couples the incident monochromatic light into the wave guide.

4. The apparatus of claim 1 further including an object imaged by the apparatus having differing areas of optical transmittance so that said differing areas modulate the focused beam of light by transmission through the object.

5. The apparatus of claim 1 further including means for generating substantially coherent monochromatic light, the light therefrom being directed at the coupling means.

6. The apparatus of claim 1 wherein said acoustic surface wave propagating medium is lithium niobate.

7. The apparatus of claim 1 wherein said optical wave guide means is formed within the acoustic surface wave propagating medium and the surface acoustic waves travel along the optical wave guide.

8. A method for imaging an object with substantially coherent, monochromatic light focussed by surface acoustic waves, comprising the steps of:

a. propagating substantially coherent, monochromatic light in an optical wave guide;

b. propagating chirped surface acoustic waves in an acoustic surface wave propagating medium;

c. interacting the light with the chirped surface acoustic waves;

d. coupling the light out of the wave guide into a focused beam that scans across the object at substantially the same speed as the surface acoustic waves propagate in the acoustic surface wave propagating medium;

e. modulating the focused beam of light with the object; and f. converting the modulated light into electrical output signals that correspond to the modulation imparted to the light by the object, thereby imaging the object.

9. The method of claim 8 further including the steps of:

a. displaying visually the electrical output signals; and b. synchronizing the visual display with the propagation of the surface acoustic waves.

10. An apparatus for imaging an object with substantially monochromatic, coherent light focused by surface acoustic waves, comprising:

a. optical wave guide means fro propagating substantially monochromatic, coherent light therein;

b. an acoustic surface wave propagating medium positioned so that surface acoustic waves associated therewith interact with the light propagating in the optical wave guide means;

c. chirp generator means fro generating and propagating chirped surface acoustic waves in the acoustic surface wave propagating medium, the light propagating in the optical wave guide means having been incident on the object and modulated by this incidence and thereafter coupled into the optical wave guide through the interaction with the surface acoustic waves in a manner such that the modulated light is scanned at the same speed as the surface acoustic waves propagate in the propagating medium; and d. photodetector means for receiving the modulated light refracted from the optical wave guide means and for converting said light into electrical output signals corresponding to the modulation imparted to the light by the object, thereby imaging said object.

11. The apparatus of claim 10 further including display means connected to the photodetector means fro converting electrical output signals into a visual presentation.

12. The apparatus of claim 11 further including timing means for sequencing the chirp generator means with the display means, said timing means being connected therebetween.

13. The apparatus of claim 10 further including an object imaged by the apparatus having differing areas of optical transmittance so that said differing areas modulate the light by transmission through the object.

14. The apparatus of claim 10 further including means for generating substantially monochromatic coherent light, said light being directed at and incident upon the object being imaged.

15. The apparatus of claim 10 wherein said acoustic surface wave propagating medium is lithium niobate.

16. The apparatus of claim 10 wherein said optical wave guide means is formed within the acoustic surface wave propagating medium and the surface acoustic waves travel along the optical wave guide.

17. A method for imaging an object with light focused by surface acoustic waves, comprising the steps of:

a. modulating substantially monochromatic, coherent light incident on the object;

b. propagating chirped surface acoustic waves in an acoustic surface wave propagating medium;

c. scanning the modulated light by selectively coupling the modulated light into an optical wave guide through interaction with the chirped acoustic waves, said scanning is performed at the same speed as the surface acoustic waves propagated in the propagating medium;

d. propagating the modulated light in the optical wave guide; and e. converting the modulated light into electrical output signals that correspond to the modulation imparted to the light by the object, thereby imaging the object.

18. The method of claim 17 further including the steps of:
   a. displaying visually the electrical output signals; and
   b. synchronizing the visual display with the propagation of the surface acoustic waves.

19. An apparatus for imaging an object with substantially monochromatic, coherent light focused by surface acoustic waves, comprising:
   a. first optical wave guide means for propagating light therein;
   b. means for coupling substantially monochromatic, coherent light incident on the apparatus into the first optical wave guide means so that said light propagates therein;
   c. a first acoustic surface wave propagating medium positioned so that surface acoustic waves associated therewith interact with the light propagating in the first optical wave guide means;
   d. second optical wave guide means for propagating light therein;
   e. a second acoustic surface wave propagating medium positioned so that surface acoustic waves associated therewith interact with the light propagating in the second optical wave guide means;
   f. chirp generator means for simultaneously generating and propagating chirped surface acoustic waves in the first and second acoustic surface wave propagating media, said surface acoustic waves interact with the light in the first optical wave guide means and thereby couple said light out of the wave guide into a focused beam, the focused beam of light scans across the object at substantially the same speed as the surface acoustic waves propagate in the propagating medium and the scanning focused light beam is modulated by the object, the modulated light is thereafter coupled into the second optical wave guide means through the interaction with the surface acoustic waves in a manner such that the modulated light is scanned at the same speed as the surface acoustic waves propagate in the propagating medium; and
   g. photodetector means for receiving the modulated light refracted from the second optical wave guide means and for converting said light into electrical output signals corresponding to the modulation imparted to the light by the object, thereby imaging said object.

20. The apparatus of claim 19 further including display means connected to the photodetector means for converting the electrical output signals into a visual presentation.

21. The apparatus of claim 20 further including timing means for sequencing the chirp generator means with the display means, said timing means being connected therebetween.

22. The apparatus of claim 19 further including means for generating substantially monochromatic coherent light, the light therefrom being directed at the coupling means so that incident monochromatic light is coupled into the first optical wave guide means.

23. The apparatus of claim 19 wherein said acoustic surface wave propagating medium is lithium niobate.

24. The apparatus of claim 19 wherein said first and second optical wave guide means are formed within the first and second acoustic surface wave propagating media, respectively, and the surface acoustic waves travel along the optical wave guides.

25. A method for imaging an object with light focused by surface acoustic waves, comprising the steps of:
   a. propagating substantially monochromatic, coherent light in a first optical wave guide;
   b. propagating chirped surface acoustic waves in a first acoustic surface wave propagating medium;
   c. interacting the light with the chirped surface acoustic waves;
   d. coupling the light out of the first wave guide into a focused beam that scans across the object at substantially the same speed as the surface acoustic waves propagate in the first acoustic surface wave propagating medium;
   e. modulating the focused beam of light with the object;
   f. propagating chirped surface acoustic waves in a second acoustic surface wave propagating medium;
   g. scanning the modulated light by selectively coupling the modulated light into a second optical wave guide through interaction with the chirped acoustic waves, said scanning is performed at the same speed as the surface acoustic waves propagate in the second propagating medium;
   h. synchronizing the propagation of surface acoustic waves in the first and second propagating media;
   i. propagating the modulated light in the second optical wave guide; and
   j. converting the modulated light into electrical output signals that correspond to the modulation imparted to the light by the object, thereby imaging the object.

26. The method of claim 25 further including the steps of:
   a. displaying visually the electrical output signals; and
   b. synchronizing the visual display with the propagation of the surface acoustic waves.

27. An apparatus for focusing light with surface acoustic waves, comprising:
   a. optical wave guide means for propagating light therein, said light having a propagation vector $\beta g$;
   b. means for coupling substantially monochromatic, coherent light incident on the apparatus into the wave guide means so that said light propagates therein;
   c. an acoustic surface wave propagating medium positioned so that surface acoustic waves associated therewith interact with the light propagating in the optical wave guide means;
   d. chirp generator means for generating and propagating chirped surface acoustic waves in the acoustic surface wave propagating medium, said surface acoustic waves interact means said light, have a propagation vector $K_a$, and couple said light out of the wave guide means at an angle $\theta$ measured with respect to the axis of propagation of the surface acoustic waves and with a propagation vector $K_n$, and wherein the propagation vectors have the following relationship:

$$\beta g = K_s \cos \theta - K_a$$

28. A method for focusing light with surface acoustic waves, comprising the steps of:
   a. propagating substantially monochromatic, coherent light in an optical wave guide, said light having a propagating vector $\beta g$;

b. propagating chirped surface acoustic waves in an acoustic surface wave propagating medium, said waves having a propagation vector $K_a$;

c. interacting the light with the chirped surface acoustic waves; and d. coupling the light out of the wave guide means into a focused beam that scans at substantially the same speed as the surface acoustic waves propagate in the acoustic surface wave propagating medium, said focused beam of light being coupled out of the wave guide means at an angle $\theta$ measured with respect to the axis of propagation of the surface acoustic waves and with a propagation vector $K_s$, and wherein the propagation vectors have the following relationship:

$$\beta g = K_s \cos \theta - K_a$$

29. An apparatus for multiplexing substantially monochromatic coherent light by interacting the light with surface acoustic waves, comprising:

a. optical wave guide means for propagating light therein:

b. means for coupling the substantially monochromatic, coherent light being multiplexed by the apparatus into the wave guide means so that said light propagates therein;

c. an acoustic surface wave propagating medium positioned so that surface acoustic waves associated therewith interact with the light propagating in the optical wave guide means;

d. chirp generator means for generating and propagating chirped surface acoustic waves in the acoustic surface wave propagating medium so that said surface acoustic waves interact with said light and thereby couple said light out of the wave guide into focused beams; and e. at least two, spaced apart, photodetector means for receiving the focused beams of light coupled out of the wave guide and for converting said light beams into corresponding electrical output signals, the focused beams of light scan across each photodetector in turn at substantially the same speed as the surface acoustic waves propagate in the propagating medium so that the light incident on the coupling means is multiplexed into a plurality of electrical output signals, one output signal corresponding to each photodetector means.

30. The apparatus of claim 29 further including light encoding means associated with the coupling means for coding the light incident on the coupling means with a signal corresponding to an electrical input signal.

31. The apparatus of claim 30 further including timing means for sequencing the light encoding means with the chirp generator means, said timing means being connected therebetween.

32. A method of multiplexing light by interacting the light with surface acoustic waves, comprising the steps of:

a. coupling the substantially monochromatic, coherent light being multiplexed into an optical wave guide;

b. propagating the light in the wave guide;

c. propagating chirped surface acoustic waves in an acoustic surface wave propagating medium;

d. coupling the light out of the wave guide into focused beams by interacting the light with the chirped surface acoustic waves; and e. scanning the focused beams of light across at least two, spaced apart, photodetectors that convert the light beams into corresponding electrical output signals, the focused beams of light scan across each photodetector in turn at substantially the same speed as the surface acoustic waves propagate in the propagating medium so that the light is multiplexed into a plurality of electrical output signals, one output signal corresponding to each photodetector means.

33. The method of claim 32 further including the steps of:

a. coding the light being multiplexed with a signal corresponding to an electrical input signal; and b. sequencing the electrical input signal with the chirped surface acoustic waves.

34. An apparatus for multiplexing substantially monochromatic coherent light by interacting the light with surface acoustic waves, comprising;

a. optical wave guide means for propagating light therein;

b. an acoustic surface wave propagating medium positioned so that surface acoustic waves associated therewith interact the said light propagating in the optical wave guide means;

c. chirp generator means for generating and propagating chirped surface acoustic waves in the acoustic surface wave propagating medium;

d. at least two, spaced apart, light generating means for transmitting two independent beams of light that are each incident on the optical wave guide means, said two independent beams being sequentially scanned and coupled into the wave guide through the interaction with the surface acoustic waves in a manner such that each beam is scanned at the same speed as the surface acoustic waves propagate in the propagating medium; and e. photodetector means for receiving the modulated light refracted from the optical wave guide means and for converting said light into electrical output signals so that the two beams of light from the light generating means are multiplexed into electrical output signals.

35. The apparatus of claim 34 further including light encoding means associated with the two light generating means for coding the light beams generated by the light generating means with signals corresponding to electrical input signals to be multiplexed.

36. A method of multiplexing light by interacting the light with surface acoustic waves, comprising the steps of:

a. propagating at least two, independent beams of light that are incident on an optical wave guide;

b. propagating chirped surface acoustic waves in an acoustic surface wave propagating medium;

c. coupling sequentially the two independent beams of light into the wave guide through interaction with the surface acoustic waves in a manner such that each beam of light is scanned at the same speed as the surface acoustic waves propagate in the propagating medium;

d. propagating the coupled light in the optical wave guide; and e. refracting the light into a photodetector means so that the light is converted into electrical output signals and so that the two beams of light from the light generating means are multiplexed into electrical output signals.

37. The method of claim 36 further including the steps of:
  a. coding the beams of light with signals corresponding to electrical input signals; and
  b. sequencing the electrical input signals with the chirped surface acoustic waves.

38. Apparatus for determining one of either the frequency of incident light at a known angle of incidence or the angle of incidence of light at a known frequency by interacting the light with surface acoustic waves, comprising:
  a. optical wave guide means for propagating light therein;
  b. an acoustic surface wave propagating medium positioned so that surface acoustic waves associated therewith interact with the light propagating in the optical wave guide means;
  c. surface acoustic wave generating means for generating and propagating surface acoustic waves in the acoustic surface wave propagating medium, said acoustic waves having a variable and determinable frequency, the incident light being incident on the optical wave guide means and selectively coupled into the wave guide means through the interaction with the surface acoustic waves;
  d. photodetector means for receiving the modulated light refracted from the optical wave guide means and for indicating when the interaction of the surface acoustic waves and incident light couples said incident light into the optical wave guide means; and
  e. means for determining the frequency of the surface acoustic waves at which the incident light is coupled into the wave guide means such that one of either the frequency of the incident light or the angle of incidence is determinable from the following equations:

$$\beta_g = k_i \cos\theta + k_a$$

$$k_a = \frac{f_a}{v_a}$$

where
  $f_a$ = the frequency of the acoustic wave at coupling
  $v_a$ = the velocity of the acoustic wave in the lithium niobate $$\arctan\left\{\left(\frac{\beta_g^2 - n_2^2 K^2}{n_1^2 K^2 - \beta_g^2}\right)^{1/2}\right\} + \arctan\left\{\left(\frac{\beta_g^2 - n_3^2 K^2}{n_1^2 K^2 - \beta_g^2}\right)^{1/2}\right\} + N\pi = (n_1^2 K^2 - \beta_g^2)^{1/2} t$$

where
  $n_1$ = the index of refraction of wave guide
  $n_2$ = the index of refraction of the substrate
  $n_3$ = the index of refraction of air $$k = \frac{2\pi}{\lambda}$$

$t$ = the thickness of the wave guide
$N$ = an integral number corresponding to the possible guide modes that can propagate in the wave guide.

39. A method for determining one of either the frequency of incident light at a known angle of incidence or the angle of incidence of light at a known frequency by interacting the light with surface acoustic waves, comprising the steps of:
  a. propagating surface acoustic waves in an acoustic surface wave propagating medium, said acoustic waves having a variable and determinable frequency;
  b. directing the incident light on to an optical wave guide means;
  c. interacting the surface acoustic waves with the incident light so that the light is selectively coupled into the wave guide means at a determinable acoustic wave frequency; and
  d. determining the frequency of the surface acoustic wave at which the incident light is coupled into the wave guide means such that one of either the frequency of the incident light or the angle of incidence is determinable from the following equations:

$$\beta_g = k_i \cos\theta + k_a$$

$$k_a = \frac{f_a}{v_a}$$

where
  $f_a$ = the frequency of the acoustic wave at coupling
  $v_a$ = the velocity of the acoustic wave in the lithium niobate $$\arctan\left\{\left(\frac{\beta_g^2 - n_2^2 K^2}{n_1^2 K^2 - \beta_g^2}\right)^{1/2}\right\} + \arctan\left\{\left(\frac{\beta_g^2 - n_3^2 K^2}{n_1^2 K^2 - \beta_g^2}\right)^{1/2}\right\} + N\pi = (n_1^2 K^2 - \beta_g^2)^{1/2} t$$

where
  $n_1$ = the index of refraction of wave guide
  $n_2$ = the index of refraction of the substrate
  $n_3$ = the index of refraction of air $$k = \frac{2\pi}{\lambda}$$

$t$ = the thickness of the wave guide
$N$ = an integral number corresponding to the possible guide modes that can propagate in the wave guide.

* * * * *

UNITED STATES PATENT AND TRADEMARK OFFICE
CERTIFICATE OF CORRECTION

PATENT NO. : 4001577
DATED : January 4, 1977
INVENTOR(S) : Andres Albanese and Calvin F. Quate It is certified that error appears in the above-identified patent and that said Letters Patent are hereby corrected as shown below:

```
Column 15, line 47, delete "focussed" and substitute
-- focused --.
Column 16, line 6, delete "fro" and substitute -- for --;
          line 12, delete "fro" and substitute -- for --;and
          line 30, delete "fro" and substitute -- for --.
Column 20, line 53, after the word "are" insert -- each --.
```

Signed and Sealed this

Fifth Day of April 1977

[SEAL]

Attest:

RUTH C. MASON
*Attesting Officer*

C. MARSHALL DANN
*Commissioner of Patents and Trademarks*